(12) United States Patent
Rahn

(10) Patent No.: US 8,238,760 B2
(45) Date of Patent: Aug. 7, 2012

(54) OPTICAL RECEIVER WITH IMPROVED NOISE TOLERANCE

(75) Inventor: Jeffrey T. Rahn, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 316 days.

(21) Appl. No.: 12/730,207

(22) Filed: Mar. 23, 2010

(65) Prior Publication Data

US 2010/0322623 A1 Dec. 23, 2010

Related U.S. Application Data

(60) Provisional application No. 61/219,128, filed on Jun. 22, 2009.

(51) Int. Cl.
*H04B 10/06* (2006.01)

(52) U.S. Cl. ........ 398/202; 398/208; 398/209; 398/183; 398/188; 398/136; 398/158; 398/159; 385/89; 385/90; 385/92; 385/93; 330/59; 330/308; 250/214 A; 250/214 LA; 250/214 AG; 250/214 RC; 375/341; 375/316; 375/260; 375/232

(58) Field of Classification Search .................. 398/202, 398/208, 209, 183, 188, 140, 141, 147, 154, 398/155, 152, 158, 159, 161, 25, 26, 27, 398/81, 65, 164, 135, 136, 203, 204, 205, 398/206, 207, 212, 213, 214, 128, 130, 138, 398/139; 385/89, 90, 92, 93; 330/59, 308; 250/214 A, 214 LA, 214 AG, 214 RC; 375/314, 375/316, 232, 260
See application file for complete search history.

(56) References Cited

U.S. PATENT DOCUMENTS 7,684,712 B1 *  3/2010  Roberts et al. ................ 398/208
7,689,133 B2 *  3/2010  Katagiri et al. ............... 398/204

* cited by examiner

*Primary Examiner* — Hanh Phan
(74) *Attorney, Agent, or Firm* — Ross M. Carothers; David L. Soltz

(57) ABSTRACT

The present invention provides a system, apparatus and method to improve the signal-to-noise ratio performance in receivers configured to receive differential data signals. According to various embodiments of the invention, a received differential signal is processed to consider both forward-looking and backward-looking error components to improve SNR performance, and ultimately the reach of the optical line system. Additional processing is provided to further enhance noise tolerance related to chromatic dispersion.

27 Claims, 6 Drawing Sheets

US 8,238,760 B2

OPTICAL RECEIVER WITH IMPROVED NOISE TOLERANCE

RELATED APPLICATION

This application claims priority to U.S. Provisional Patent Application No. 61/219,128, filed Jun. 22, 2009, the disclosure of which is incorporated by reference herein in its entirety.

BACKGROUND OF THE INVENTION

1. Field of the Invention

This invention relates generally to optical telecommunication systems and, more particularly, to optical receivers configured to receive differential optical signals.

2. Description of the Related Art

In an effort to meet increasing capacity needs associated with wavelength-division multiplexed (WDM) optical telecommunication systems, various modulation schemes have been developed. A receiver configured to demodulate differential modulation schemes, such as differential phase-shift keying (DPSK) and differential quadrature phase-shift keying (DQPSK) signals, may be configured to determine the change in phase of a received data signal over time, as opposed to the determination of the actual phase of the data signal with reference to a local oscillator, associated with other phase-shift keying schemes. The changes in phase over time in the received data signal thus represent the actual data encoded in the data signal. Such systems may rely on observing a phase change between a received data signal and a reference signal directed derived from the received signal, the reference signal being equal to the received data signal, however, delayed by one bit period for example. The phase change between the received data signal and the reference signal thus representing the encoded data. The phase difference between the received data signal and the reference signal would then represent the encoded data, which can be visualized on a constellation diagram for example, as is well known in the art.

Such differential modulation schemes, such as differential phase-shift keying (DPSK) and differential quadrature phase-shift keying (DQPSK), can be significantly easier to implement in optical receivers since a local oscillator is not necessarily needed at the receiver to determine a phase change with respect to a received data signal. However, the signal-to-noise ratio (SNR) performance of such a differential modulation scheme such as DPSK or DQPSK may be generally worse than coherent schemes, which may rely on a local oscillator at the receiver for example. One source of noise in a receiver configured to implement differential modulation schemes may be optical noise on the delayed reference signal utilized in the demodulation. For example, optical noise on the delayed reference signal, may lead to corresponding phase errors in the delayed reference signal in the optical domain. Once demodulated, these phase error may lead to corresponding errors in the demodulated signal. Since the phase errors generally impact two adjacent symbols, as part of a differential signal for example, and ultimately adjacent demodulated bits, these phase errors may be referred to as correlated phase errors or correlated errors between said two adjacent symbols. More information regarding differential receivers, among others, can be found in U.S. patent application Ser. No. 12/572,179, incorporated herein by reference in its entirety.

What is needed is an optical receiver having an increased tolerance to optical noise resulting in an optical line system having improved reach.

SUMMARY OF THE INVENTION

The present invention provides a system, apparatus and method to improve the signal-to-noise ratio performance in receivers configured to receive differential data signals, such as DPSK and DQPSK signals. According to various embodiments of the invention, a received differential signal is processed to consider both forward-looking and backward-looking errors with respect to any symbol of the differential data signal to improve SNR performance, and ultimately improve the overall reach of the optical line system. Additional processing is provided to further enhance noise tolerance related to chromatic dispersion.

According to various embodiments of the invention, in one example a receiver comprises various components which are configured to receive the in-phase (I) and quadrature (Q) portions of a DQPSK signal, as portions of a stream of symbols for example, each symbol representative of two bits of modulated data. The symbol stream is processed to generate error correction signals on a symbol-by-symbol basis, each error correction signal for any particular symbol in time including a first correlated error between that particular symbol and an adjacent symbol forward-looking 1 baud period in time, and a second correlated error between that particular symbol and an adjacent symbol backward-looking 1 baud period in time. The error correction signal is then added back to the received DQPSK signal, to remove a portion of the optical noise on the received DQPSK signal, and to generate a new DQPSK signal having improved tolerance to noise as compared to the originally received DQPSK signal. In other embodiments of the invention, various gain elements are present to adjust or tune the degree of correction for optimal performance and provide signal level equalization between the in-phase (I) and the quadrature (Q) portions of the newly generated DQPSK signal, if desired. In still other embodiments of the invention additional processing is performed to further enhance the receiver noise tolerance with respect to chromatic dispersion. In additional embodiments, the first correlated error is calculated based upon a first plurality of symbols forward-looking a first time period relative a particular symbol and a second plurality of symbols backward-looking a second time period relative the particular symbol. Ultimately, a receiver having an improved tolerance to noise will allow for WDM optical telecommunication systems having longer reach.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. In the drawings wherein like reference symbols refer to like parts.

DETAILED DESCRIPTION OF THE INVENTION

The present invention provides a system, apparatus and method to improve the signal-to-noise ratio performance in receivers configured to receive differential data signals. According to various embodiments of the invention, a received differential signal is processed to consider both forward-looking and backward-looking error components to improve SNR performance, and ultimately the overall reach of the optical line system. Additional processing is provided to further enhance noise tolerance related to chromatic dispersion.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may include certain aspects each of which may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Figure 1:
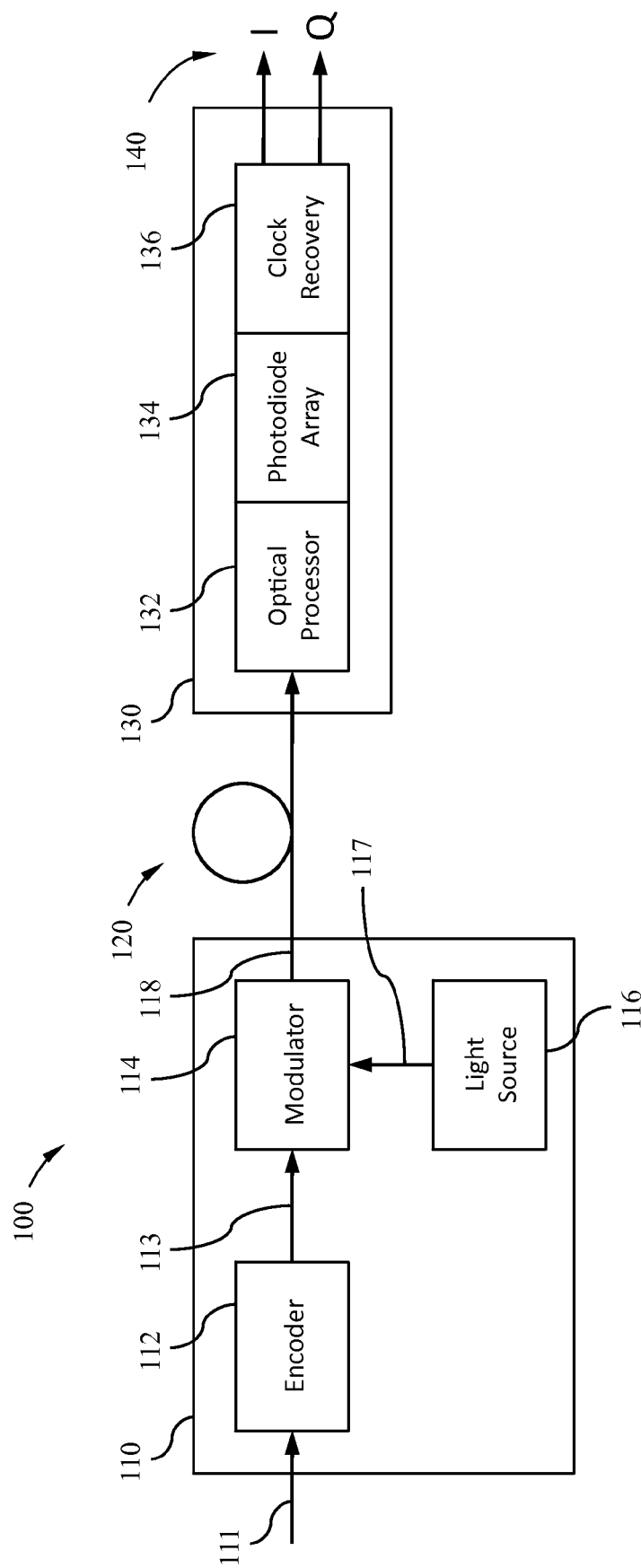
FIG. 1 is a block diagram of an exemplary WDM optical line system, according to certain aspects of the invention.

FIG. 1 illustrates a block diagram of an exemplary WDM optical telecommunication system 100, according to certain aspects of the invention. The WDM optical telecommunication system 100 includes a DQPSK transmitter 110, an optical line system 120, and a DQPSK receiver 130. This invention is not dependent on the various schemes of multiplexing utilized, including but not limited to, polarization multiplexing and wavelength multiplexing, such multiplexing schemes neither excluded nor required for the practice of this invention. The DQPSK transmitter 110, may include a DQPSK encoder 112 which encodes an incoming electrical signal 111 into two discrete signals 113 provided as an input to the DQPSK modulator 114. The DQPSK modulator 114, in response to the two input signals 113, modulates the optical signal 117 received from a laser source 116, e.g. an optical light source, providing an optical output 118 for transmission on the optical line system 120. The modulator 114 can be any suitable modulator, preferably a Mach-Zehnder modulator. The laser source 116 can be any suitable laser source, such as a distributed Bragg reflector (DBR) laser source or a distributed feedback (DFB) laser source, for example.

DQPSK reception by the receiver 130 is typically performed using a optical bit-delay and optical hybrid structure including an optical processor 132 and a photodiode array 134. The optical processor 132 provides a plurality of optical signals in response to the received optical signal 118, the plurality of optical signals being converted into the electrical domain by the photodiode array 134. For example, each one of the photodiodes in the array converts a corresponding one of the plurality of optical signals into an electrical signal. The resulting plurality of electrical signals are then provided to a clock recovery circuit 136 resulting in two electrical output signals 140, an in-phase (I) signal and a quadrature (Q) signal, which can be described as the complex representation of the phase change between two adjacent symbols. Mathematically, the electrical signals represent the product:

$$E_k = A_{k-1}^* A_k \quad (1)$$

where $A_k$ represents the complex representation of the electric field at time index k and $E_k$ is the complex representation of the electrical signal out of the photodiode array 134 at time k.

When the electrical signal is impaired by an optical noise source, this can be expressed by adding a complex noise term $n_k$ to $A_k$, resulting in:

$$E_k = (A_{k-1} + n_{k-1})^*(A_k + n_k) \quad (2)$$
$$= A_{k-1}^* A_k + n_{k-1}^* A_k + n_k A_{k-1}^* + n_{k-1}^* n_k$$

The electrical field can be written equivalently in polar coordinate notation as:

$$E_k = |E_k| e^{j(\phi_k - \phi_{k-1} + \eta_k)} \quad (3)$$

where $\phi_k$ represents the optical phase at time k, and $\eta_k$ represents phase noise at time k. Since optical phase noise will lead directly to phase noise between the in-phase (I) and quadrature (Q) components of the corresponding electrical signal, $\eta_k$ will be used herein to refer to both phase noise quantities. In order to maintain the equivalence between equations 2 and 3, the optical phase $\phi$ and phase noise $\eta$ terms must be complex. However, for a phase modulated format, e.g. DQPSK, $\phi$ will be a real quantity. Gain control can be applied to the stream of symbols as a part of the detection process to normalize the optical magnitude for unity; this will be applied here by setting $|E_k|=1$.

Assuming the noise terms are small, the phase noise introduced by the optical noise terms can be estimated by combining equations 2 and 3, and dropping terms quadradic in noise:

$$|E_k| e^{j(\phi_k - \phi_{k-1})}(1+j\eta_k) = A_{k-1}^* A_k + n_{k-1}^* A_k + n_k A_{k-1}^* j\eta_k |E_k| e^{j(\phi_k - \phi_{k-1})} = n_{k-1}^* e^{j\phi_k} + n_k e^{-j\phi_{k-1}} \quad (4)$$

Equation 4 associates the phase noise term $\eta_k$ with the corresponding optical noise terms $n_k$. The electrical field has been expressed in terms of the optical phase term $\phi_k$ which should be a multiple of $$\frac{m\pi}{2} + \frac{\pi}{4}$$

for integer m.

Simplifying equation 4, and ignoring the amplitude noise, yields:

$$\eta_k = imag(n_{k-1}^* e^{j\phi_{k-1}} + n_k e^{-j\phi_k}) \quad (5)$$
$$= imag(n_k e^{-j\phi_k}) - imag(n_{k-1} e^{-j\phi_{k-1}})$$

The phase noise term $\eta_k$ can be determined at every time slice by comparing the phase of the electrical signal with the nearest possible point on the DQPSK constellation. The noise observed at any symbol can be reduced by combining, such as adding for example, a phase rotation on a symbol-by-symbol basis, the phase rotation being a fraction of the phase noise from the previous symbol and the next symbol, e.g. an adjacent symbol backward-looking one baud period in time and an adjacent symbol forward-looking one baud period in time. This phase term takes the form:

$$\omega_k = \frac{\eta_{k-1} + \eta_{k+1}}{2} \quad (6)$$

With the addition of this phase term, the phase noise observed on any symbol k is:

$$\eta_k + \omega_k = \frac{1}{2}[-imag(n_{k-2}e^{-j\phi_{k-2}}) + imag(n_{k-1}e^{-j\phi_{k-1}}) - imag(n_k e^{-j\phi_k}) + imag(n_{k+1}e^{-j\phi_{k+1}})] \quad (7)$$

For the case where the optical noise terms are uncorrelated, the phase noise will be the quadratic sum of these four terms. The standard deviation of half of the sum of four uncorrelated Gaussian terms is $$\frac{\sqrt{2}}{2}$$

times smaller than the standard deviation of the sum of two uncorrelated Gaussian distribution. This is equivalent to an improvement in SNR at the receiver of 1.5 dB.

In order to implement the correction represented by equation 7 above, the phase deviation term $\eta_k$ can be estimated using a first-order approximation to the phase noise, as represented in the following equation:

$$\tilde{\eta}_k = \text{Sign}(Re\{E_k\})[Im\{E_k\} - \text{Sign}(Im\{E_k\})] - \text{Sign}(Im\{E_k\})[Re\{E_k\} - \text{Sign}(Re\{E_k\})] \quad (8)$$

Here, $\tilde{\eta}_k$ is distinct from $\eta_k$ since $\tilde{\eta}_k$ is estimated from the received data. The corrected data stream can then be represented by the following:

$$E_k' = E_k - w\tilde{\omega}_k \text{Sign}(Im\{E_k\}) + jw\tilde{\omega}_k \text{Sign}(Im\{E_k\}) \quad (9)$$

where $$\tilde{\omega}_k = \frac{\tilde{\eta}_{k-1} + \tilde{\eta}_{k+1}}{2},$$

and w represents a scaling or gain term to provide a degree of correction desired. As will be better understood in the further discussion below, it may be desirable to fine tune the degree of correction provided by the solution represented by equation 9 by slightly modifying the gain term w, or eliminate the solution entirely by setting w to zero resulting in $E_k' = E_k$ for example. The optimal value for w is 0.5, however due to propagation of errors through the system, the best performance may be obtained by applying a smaller value such that $0 \leq w < 0.5$. For example, since $\eta_k$ is estimated from the received data, $\eta_k$ may contain erroneous values from time to time, e.g. when a bit error occurs. Such an erroneous error can propagate through the system, and a smaller gain term will act to limit the impact of such an erroneous value in the overall correction. In practice, w would be chosen to provide the optimal benefit, which likely reduces the performance benefit from the ideal 1.5 dB, for example to 0.8 dB. This selection could be done empirically, or using feedback from, for example, the bit-error ratio, counts of error corrections performed by a forward error correction (FEC) circuit, or a representation of a data eye opening with respect to a circuit output, the output of the processing circuit of FIG. 2 for example discussed further below. Implementation of the gain term can be achieved through any suitable means, for example through the use of a microprocessor based control system, as also discussed in greater detail below.

Since the phase noise is based upon an estimation of received data, e.g. $\tilde{\eta}_{k-1}$ and $\tilde{\eta}_{k+1}$, the phase noise itself is represented by the term $\tilde{\omega}_k$, as distinct from $\omega_k$. The solution representative of equation 9 can be achieved in the equivalent signal processing as depicted in FIG. 2.

Figure 2:
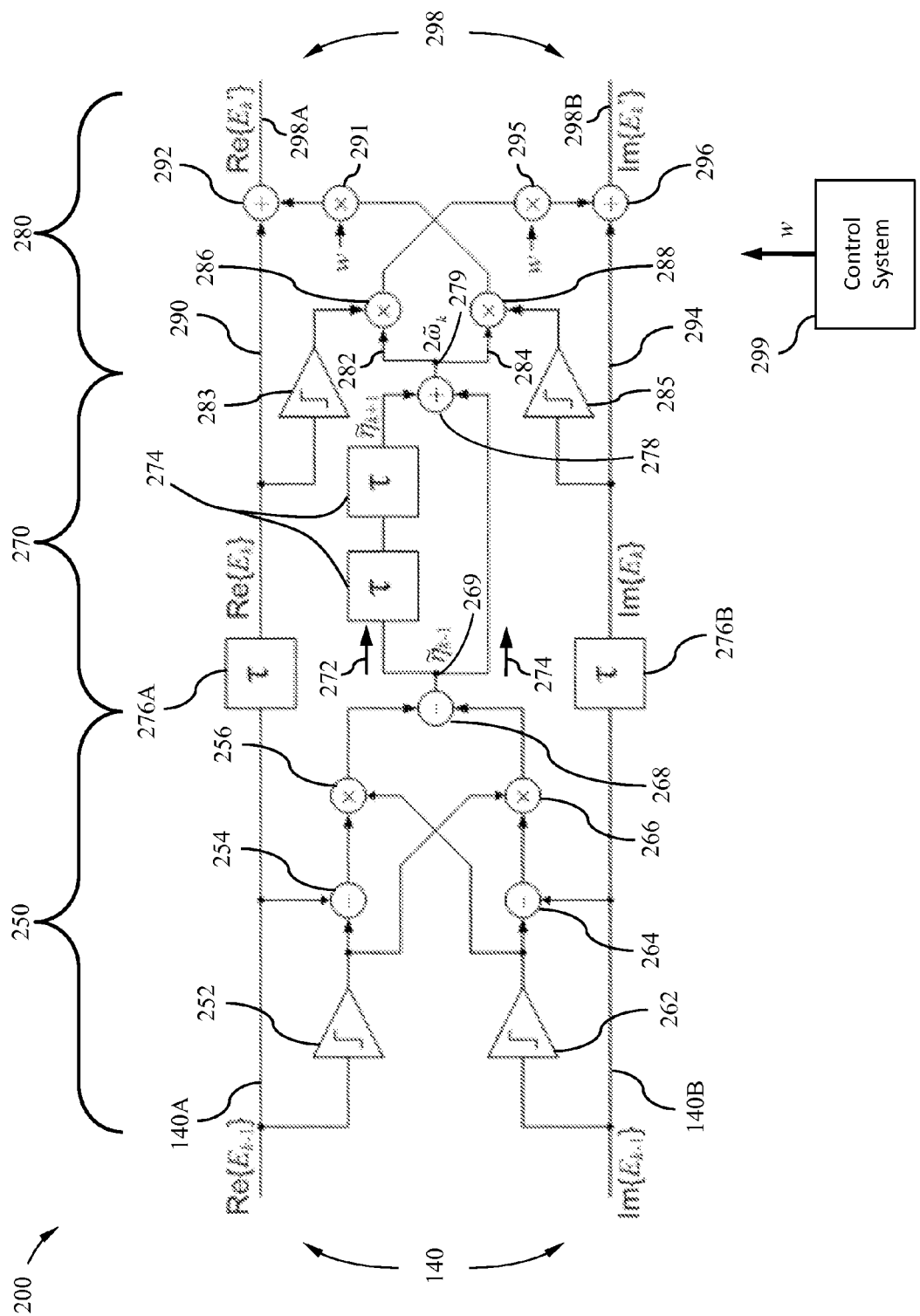
FIG. 2 is a block diagram of a first exemplary signal processing circuit, according to certain aspects of the invention.

FIG. 2 illustrates a block diagram of a first exemplary signal processing circuit 200 for improvement in SNR in accordance with the mathematical analysis above, and more specifically in accordance with equations 8 and 9. The processing circuit 200 may be implemented in hardware, software, firmware, or a combination thereof. If in hardware, the processing circuit may be constructed through any suitable means, for example analog circuitry, or digital circuitry such as customized digital integrated circuits, application specific integrated circuits (ASICs), programmable gate arrays (PGAs), field programmable gate arrays (FPGAs), or other similar devices, including combinations thereof. Firmware, if utilized, can be stored in a memory device, such as a programmable memory device (PROM), an erasable programmable memory device (EPROM), an electrically erasable programmable memory device (EEPROM), or other similar device. Such firmware may be executed by a multiprocessor or digital signal processor (DSP).

As shown in FIG. 2, the in-phase (I) signal 140A and the quadrature (Q) signal 140B are provided to the circuit 200, e.g. as a part of the clock recovery circuit 136 depicted in FIG. 1, in the alternate form of $Re\{E_{k-1}\}$ 140A and $Im\{E_{k-1}\}$ 140B, respectively, consistent with the discussion above. Since the outputs $Re\{E_k'\}$ and $Im\{E_k'\}$ are in terms of a symbol k, the input values $Re\{E_{k-1}\}$ and $Im\{E_{k-1}\}$ are represented in terms of symbol k−1, the symbol at baud period k−1. The $Re\{E_{k-1}\}$ signal 140A and the $Im\{E_{k-1}\}$ signal 140B have the same symbol rate and, thus, the same baud period. The $Re\{E_{k-1}\}$ signal 140A is provided to a delay element 276A, as illustrated. The delay element 276A is configured to provide a delay of 1 baud period prior to allowing the propagation of a delayed $Re\{E_k\}$ signal 290 to a first input of summing point 292. Similarly, the $Im\{E_{k-1}\}$ signal 140B is provided to a delay element 276B, the signal 140B being delayed a time period of 1 baud period, a delayed $Im\{E_k\}$ signal 294 provided at a first input of summing point 296. It is noted that the delayed $Re\{E_k\}$ signal 290 is equivalent to the $Re\{E_{k-1}\}$ or in-phase (I) signal 140A, delayed by 1 baud period in time. Likewise, the delayed $Im\{E_k\}$ signal 294 is equivalent to the $Im\{E_{k-1}\}$ or quadrature (Q) signal 140B, delayed by 1 baud period in time.

The $Re\{E_{k-1}\}$ signal 140A is also provided to a first circuit portion as generally defined by bracket 250, which determines the phase noise term at time k−1, denoted $\eta_{k-1}$. More specifically, the signal 140A is provided to a limiting amplifier 252 which provides one of two outputs with respect to the input, e.g. the output of the limiting amplifier 252 moves from a first output to a second output based upon the input $Re\{E_{k-1}\}$ signal 140A. For example, for values of input $Re\{E_{k-1}\}$ signal 140A less than zero the limiting amplifier 252 may output a first voltage, and for values of input Re{$E_{k-1}$} signal 140A greater than or equal to zero the limiting amplifier 252 may output a second voltage. In a digital implementation, the limiting amplifier represents the sign of the input Re{$E_{k-1}$}. The output of the limiting amplifier 252 is provided to a first input of a first difference element 254. The input signal 140A is also provided to a second input of the first difference element 254, the first difference element 254 providing an output being the difference between the output of the limiting amplifier 252 and the input signal 140A. The output of the first difference element 254 provided as a first input to a first multiplying element 256 of the first circuit portion 250. The output of the limiting amplifier 252 is also provided to a first input of a second multiplying element 266.

As with the Re{$E_{k-1}$} signal 140A, the Im{$E_{k-1}$} signal 140B is also provided to the first circuit portion 250. More specifically, the signal 140B is provided to a limiting amplifier 262 which, similar to the limiting amplifier 252, provides a rail-to-rail output with respect to the input. The output of the limiting amplifier 262 is provided to a first input of a second difference element 264. The input signal 140B is also provided to a second input of the second difference element 264, the second difference element 254 providing an output being the difference between the output of the limiting amplifier 262 and the input signal 140B. The output of the second difference element 254 provided as a second input to the first multiplying element 256 of the first circuit portion 250. The output of the limiting amplifier 262 is also provided to a second input of the second multiplying element 266. The output of the first multiplying element 256 and the output of the second multiplying element 266 are provided to first and second inputs of a difference element 268. The difference element 268 calculates the difference between the output of the first multiplying element 256 with the output of the second multiplying element 266 and provides a difference signal 269, representative of the estimated phase noise at time period k−1, e.g. $\tilde{\eta}_{k-1}$, at an output of the first circuit portion 250, as depicted.

The $\tilde{\eta}_{k-1}$ signal 269 is then provided as an input to a second circuit portion 270. The main purpose of second circuit portion 270 is to use the computed phase noise of the current symbol to predict the phase noise on the neighboring symbols. As stated above, the error correction signal including a first correlated error signal related to the current symbol, the symbol at time k, and an adjacent symbol forward in time, the symbol at time k−1, and a second correlated error signal related to the current symbol and an adjacent symbol backward in time, the symbol at time k+1.

The second circuit portion 270 includes two signal paths through which the $\eta_{k-1}$ signal 269 will pass. A first signal path indicated by arrow 272 includes one or more delay elements 274 to provide a delay of 2 baud periods to the $\tilde{\eta}_{k-1}$ signal 269 propagating down the first signal path 272. A delayed signal, e.g. $\tilde{\eta}_{k+1}$ and ending at a first input of a summing point 278 of the second circuit portion 270. While two delay elements 274 are depicted, one of ordinary skill in the art would appreciate that a signal delay element having a delay of 2 baud periods would be sufficient. A second signal path indicated by arrow 274 has no delay allowing $\tilde{\eta}_{k-1}$ signal 269 to pass directly to a second input of the summing point 278 of the second circuit portion 270 without delay. The output of the summing point 278 of the second circuit portion 270, thus, equaling the summation of the forward-looking noise component $\tilde{\eta}_{k-1}$ signal and the backward-looking noise component $\tilde{\eta}_{k+1}$ signal, which equals an output signal 279 of the second circuit portion 270, also referred to as $2\tilde{\omega}_k$ signal 279.

A third circuit portion 280 accepts the $2\tilde{\omega}_k$ signal 279 and provides a desired gain to the signal 279. The third circuit portion 280 includes a first path indicated by arrow 282 and a second path indicated by arrow 284. As illustrated, the $2\tilde{\omega}_k$ signal 279 propagates down the first path 282 to a first input of multiplying element 286. A limiting amplifier 283, similar to the limiting amplifiers 252, 262 described above, accepts the delayed Re{$E_k$} signal 290 and provides an output signal to a second input of the multiplying element 286. The output of the multiplying element 286 is then provided to a gain element 295 which provides a gain of w prior to passing on to a second input of the summing element 296. Similarly, the $2\tilde{\omega}_k$ signal 279 propagates down the second path 284 to a first input of a multiplying element 288. A limiting amplifier 285, similar to the limiting amplifiers 252, 262 described above, accepts the delayed Im{$E_k$} signal 294 and provides an output signal to a second input of the multiplying element 288. The output of the multiplying element 288 is then provided to a gain element 291 which provides a gain of w prior to passing on to a second input of the summing element 292. The processing circuit 200 provides an output signal 298 which includes an output signal 298A from the summing element 292 and an output signal 298B from the summing element 296. The output signals 298A, 298B represent the corrected in-phase (I) and quadrature (Q) signals, respectively, the in-phase (I) signal also referred to as Re{$E_k'$} signal 298A, while the quadrature (Q) signal also referred to as the Im{$E_k'$} signal 298B.

As stated above, the gain term w can be provided by a control system 299, as depicted. The gain value w is nominally approximately 0.5, however may be fine tuned to provide an optimal output. The tunability itself can be provided by an operator manually adjusting the gain term w while viewing the output signal 298 until an optimal output signal is achieved. Alternatively, the control system can be provided with a representation of the output signal 298 as feedback, the control system continually adjusting the gain term w until an optimal output is achieved.

Figure 3:
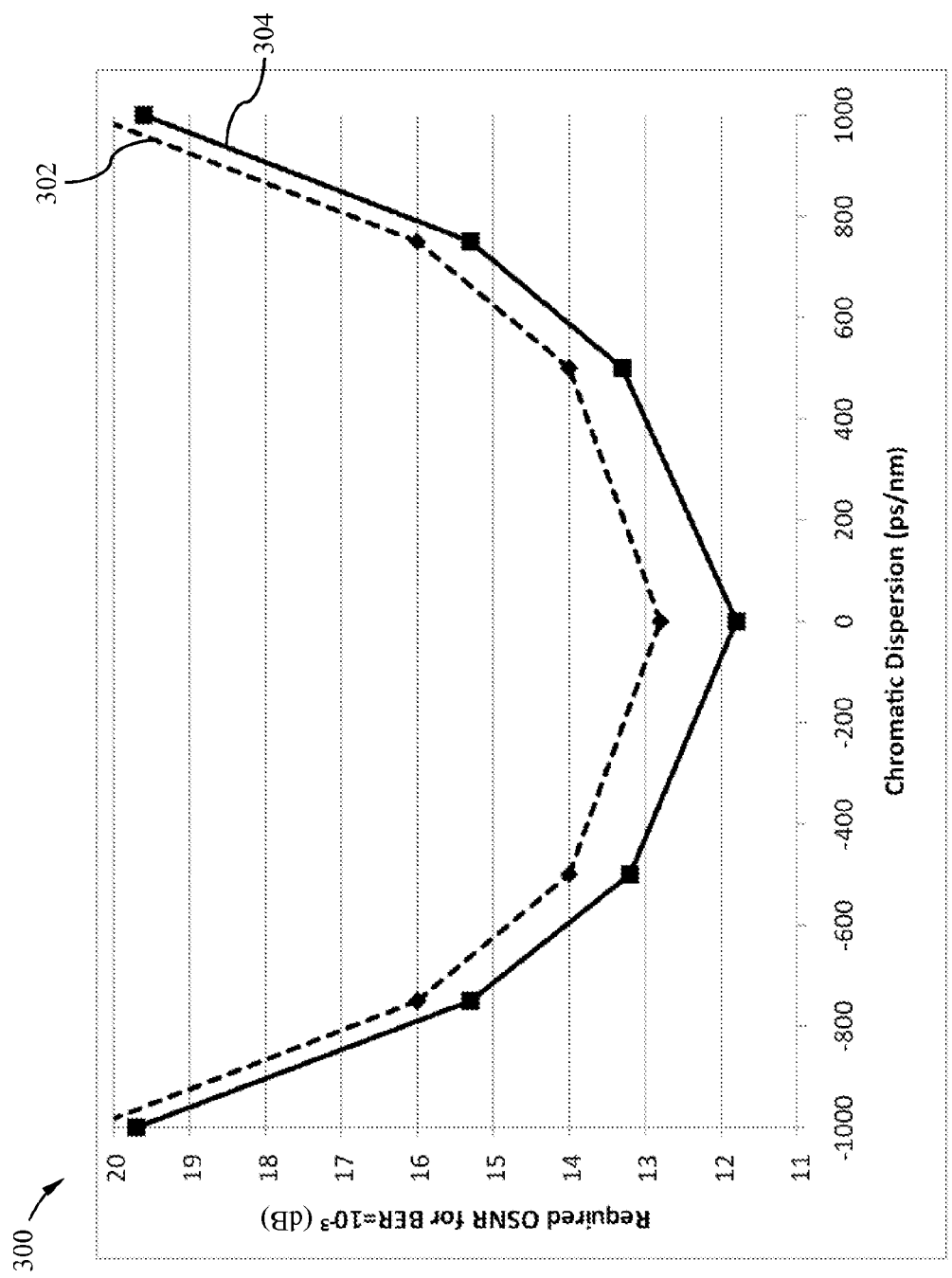
FIG. 3 is a graph depicting advantages of the first signal processing circuit of FIG. 2.

The first exemplary signal processing circuit 200 has been demonstrated in simulation and a 0.8 dB reduction in the optical SNR, with respect to achieving a bit error rate of $1 \times 10^{-3}$, was observed. Although the present invention is not dependent on any one particular multiplexing scheme, e.g. polarization or wavelength multiplexing, the simulation is for a single wavelength, polarization multiplexed transmission. FIG. 3 illustrates improvement of optical noise tolerance with respect to chromatic dispersion. As depicted in graph 300, approximately 1.0 dB of improvement is observed with respect to chromatic dispersion between an unprocessed signal, identified as curve 302 of graph 300, and a processed signal through the use of the first exemplary circuit of FIG. 2, identified as curve 304 of graph 300.

With reference to FIG. 3, with higher levels of chromatic dispersion, SNR tolerance drops off. Such chromatic dispersion leads to inter-symbol interference (ISI), where a first symbol in time interferes with an adjacent symbol in time. ISI can be overcome through equalization for ISI in a differential phase-shift keying signal. As a starting point, chromatic dispersion can be modeled as a simple finite impulse response (FIR) filter in the optical domain:

$$A_k = h_{-1}T_{k-1} + h_0 T_k + h_1 T_{k+1} \tag{10}$$

where, as with equation 1 above, $A_k$ is the complex representation of the electrical field at time index k, and $h_{-1}$, $h_0$, and $h_1$ are coefficients h(k) of the FIR filter, as is known in the art. When passed through a differential detection element, as represented by equation 1 above, the result becomes:

$$E_k = (h_{-1}T_{k-1} + h_0 T_k + h_1 T_{k+1})(h_{-1}*T_{k-2}* + h_0*T_{k-1}* + h_1*T_k*) \tag{11}$$

which can be expanded into the following 9 terms:

$$E_k = h_{-1}h_{-1}^*T_{k-1}T_{k-2}^* \quad (12.1)$$
$$+ h_{-1}^*h_0 T_k T_{k-2}^* \quad (12.2)$$
$$+ h_{-1}^*h_1 T_{K+1}T_{k-2}^* \quad (12.3)$$
$$+ h_{-1}h_0^* T_{k-1}T_{k-1}^* \quad (12.4)$$
$$+ h_0 h_0^* T_k T_{k-1}^* \quad (12.5)$$
$$+ h_0^* h_1 T_{K+1}T_{k-1}^* \quad (12.6)$$
$$+ h_{-1}h_1^* T_{k-1}T_k^* \quad (12.7)$$
$$+ h_0 h_1^* T_K T_k^* \quad (12.8)$$
$$+ h_1 h_1^* T_{k+1}T_k^* \quad (12.9)$$

collectively referenced as equation 12. For chromatic dispersion as a large source of inter-symbol interference, the values of h can be seen in the following table 1, depicting approximate values of inter-symbol interference parameters due to optical chromatic dispersion at 11.1 GB/s line rate. Here the next-nearest terms are included as well, but since they are less than 1% for modest chromatic dispersion values these contributions are ignored.

TABLE 1

| Chromatic Dispersion (ps/nm) | $h_{-2}$ | | $h_{-1}$ | | $h_0$ | $h_1$ | | $h_2$ | |
|---|---|---|---|---|---|---|---|---|---|
| | I | Q | I | Q | I | I | Q | I | Q |
| −1500 | 0.01 | 0.01 | −0.04 | 0.22 | 0.51 | −0.04 | 0.22 | 0.01 | 0.01 |
| −1250 | 0.00 | 0.01 | −0.07 | 0.18 | 0.59 | −0.07 | 0.18 | 0.00 | 0.01 |
| −1000 | 0.00 | 0.00 | −0.08 | 0.13 | 0.69 | −0.08 | 0.13 | 0.00 | 0.00 |
| −750 | 0.00 | 0.00 | −0.06 | 0.08 | 0.81 | −0.06 | 0.08 | 0.00 | 0.00 |
| −500 | 0.00 | 0.00 | −0.02 | 0.04 | 0.91 | −0.02 | 0.04 | 0.00 | 0.00 |
| −250 | 0.00 | 0.00 | 0.00 | 0.02 | 0.96 | 0.00 | 0.02 | 0.00 | 0.00 |
| 0 | 0.00 | 0.00 | 0.00 | 0.01 | 0.98 | 0.01 | 0.00 | 0.00 | 0.00 |
| 250 | 0.00 | 0.00 | 0.00 | 0.02 | 0.96 | 0.00 | 0.02 | 0.00 | 0.00 |
| 500 | 0.00 | 0.00 | −0.02 | 0.04 | 0.91 | −0.02 | 0.04 | 0.00 | 0.00 |
| 750 | 0.00 | 0.00 | −0.06 | 0.08 | 0.81 | −0.06 | 0.08 | 0.00 | 0.00 |
| 1000 | 0.00 | 0.00 | −0.08 | 0.13 | 0.69 | −0.08 | 0.13 | 0.00 | 0.00 |
| 1250 | 0.00 | 0.01 | −0.07 | 0.18 | 0.59 | −0.07 | 0.18 | 0.00 | 0.01 |
| 1500 | 0.01 | 0.01 | −0.04 | 0.22 | 0.51 | −0.04 | 0.22 | 0.01 | 0.01 |

Thus, assuming that $h_0$ is a large value with respect to the other terms in equation 12, those terms which are not at least linear in $h_0$, e.g. terms 12.1, 12.3, 12.7, and 12.9, may be ignored. Additionally, equation terms 12.4 and 12.8 are DC terms which can be easily removed with a DC filter or block, and thus require no correction. Therefore, equation 12 can be reduced to the desired signal 12.5, with interference terms 12.2 and 12.6. We focus first on interference term 12.2, which can be rewritten as follows:

$$h_{-1}^* h_0 T_k T_{k-2}^* = h_{-1}^* h_0 T_k (T_{k-1}^* T_{k-1}) T_{k-2}^* \quad (13.1)$$
$$= h_{-1}^* h_0 (T_k T_{k-1}^*)(T_{k-1} T_{k-2}^*) \quad (13.2)$$
$$\boxed{\propto R_k R_{k-1}} \quad (13.3)$$

Here $R_k$ denotes the value which would have been observed at the receiver in the absence of inter-symbol interference or noise. Accordingly, since $R_{k-1}$ is based upon $R_k$, however delayed by 1 baud period in time, sufficient information is available in the received data to estimate and mitigate the impact of chromatic dispersion. Since interference term 12.6 is proportional to term 12.2, however shifted by 1 baud period in time, a similar solution can be used to mitigate the impact of term 12.6, as well. Therefore $E_k'$ can be computed as follows:

$$E_k'=E_k+w_1F_k+jw_2F_k+w_3G_k+jw_4G_k+w_5F_{k+1}+jw_6F_{k+1}+ \\ w_7G_{k+1}+jw_8G_{k+1} \quad (14)$$

where:

$$F_k=\text{Sign}(Im\{E_{k-1}\})\text{Sign}(Re\{E_k\}); \text{ and}$$

$$G_k=\text{Sign}(Re\{E_{k-1}\})\text{Sign}(Im\{E_k\})$$

The gain terms $w_1$ through $w_8$ represent scaling or gain terms to provide a degree of correction desired. Thus, it may be desirable to fine tune the degree of correction provided by the solution represented by equation 14 by slightly modifying one or more of the gain terms $w_n$, where n is an integer from 1 to 8, in order to best mitigate chromatic dispersion in the optical link. Additionally, if desired, each of the gain terms $w_n$ can be set to 0, effectively eliminating the solution entirely, resulting in $E_k'=E_k$ for example.

Figure 4:
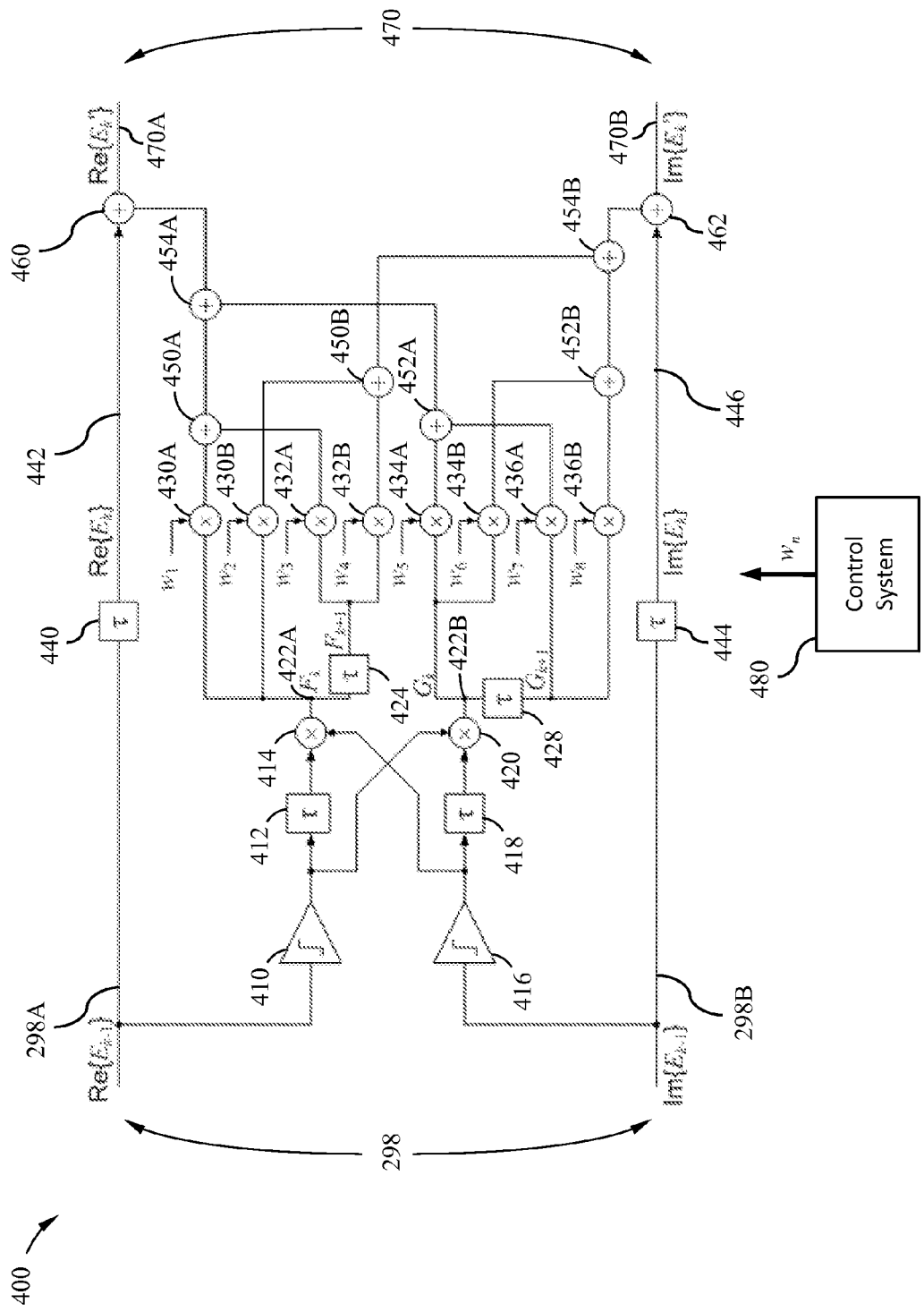
FIG. 4 is a block diagram of a second exemplary signal processing circuit, according to certain aspects of the invention.

FIG. 4 illustrates a block diagram of a second exemplary signal processing circuit 400 for improvement in SNR through specific mitigation of chromatic dispersion in accordance with the mathematical analysis above. Although not necessary, the circuit 400 may be used in tandem with the first exemplary signal processing circuit 200 of FIG. 2, the output signal 298 of the signal processing circuit 200, including the in-phase (I) signal 298A and the quadrature (Q) signal 298B, being supplied as an input to the circuit 400, as illustrated. The in-phase (I) signal 298A is also referred to as $Re\{E_{k-1}\}$ signal 298A, e.g. the real component of the signal 298 at time period k−1, in FIG. 4 consistent with the mathematics discussed immediately above. Similarly, the quadrature (Q) signal 298B is also referred to as $Im\{E_{k-1}\}$ signal 298B, e.g. the imaginary component of the signal 298 at time period k−1, in FIG. 6 consistent with the mathematics discussed immediately above.

As depicted, the $Re\{E_{k-1}\}$ signal 298A is provided to, both, a delay element 440 and a limiting amplifier 410, the limiting amplifier 610 being similar to the limiting amplifier 250 of the embodiment of FIG. 2 for example. The delay element 440 provides a delay of 1 baud period and provides a delayed signal or $Re\{E_k\}$ signal 442 to a first input of a summing element 460. The output of the limiting amplifier 410 is provided to, both, a delay element 412 and a first input of a multiplying element 420. The delay element 412 delays the output received from the limiting amplifier 410 by a delay of 1 baud period and provides the delayed signal to a first input of a multiplying element 414. Similarly, the $Im\{E_{k-1}\}$ signal 298B is provided to, both, a delay element 444 and a limiting amplifier 416, the limiting amplifier 416 being similar to the limiting amplifier 262 of the embodiment of FIG. 2. The delay element 444 provides a delay of 1 baud period and provides a delayed signal 446 to a first input of a summing element 462. The output of the limiting amplifier 416 is provided to, both, a delay element 418 and a second input of the multiplying element 414. The delay element 416 delays the output received from the limiting amplifier 416 by a delay of 1 baud period and provides the delayed signal to a second input of the multiplying element 420.

Multiplying element 414 outputs a correction signal, $F_k$ signal 422A, and provides the $F_k$ signal 422A to a first pair of gain elements 430A, 430B, and a first delay element 424. The delay element 424 delays the input $F_k$ signal 422A by 1 baud period and provides a delayed signal, or $F_{k-1}$ signal 425 to a second pair of gain elements 432A and 432B. Similarly, multiplying element 420 outputs a correction signal, $G_k$ signal 422B, and provides the $G_k$ signal 422B to a third pair of gain elements 434A, 434B, and a second delay element 426. The delay element 426 delays the input $G_k$ signal 422B by 1 baud period and provides a delayed signal, or $G_{k-1}$ signal 422B, to a fourth pair of gain elements 436A, 436B. Each gain element 430A-436B has a respective gain term $w_n$, where n is an integer from 1 to 8. As with the gain term w discussed with respect to the circuit 200 of FIG. 2, $w_n$ can be optimally set, as discussed in more detail below.

The outputs of gain element 430A and gain element 432A are summed together in a summing element 450A, and the outputs of gain element 430B and gain element 432B are summed together in a summing element 450B. Similarly, the outputs of gain element 434A and gain element 436A are summed together in a summing element 452A, and the outputs of gain element 434B and gain element 436B are summed together in a summing element 452B. The outputs of summing element 450A and 452A are summed together in a summing element 454A, the summed output of summing element 454A provided as a correction signal to a second input of summing element 460. The outputs of summing element 450B and 452B are summed together in a summing element 454B, the summed output of summing element 454B provided as a correction signal to a second input of summing element 462.

The processing circuit 400 provides an output signal 470 which includes an output signal 470A from the summing element 460 and an output signal 470B from the summing element 462. The output signals 470A, 470B represent the corrected in-phase (I) and quadrature (Q) signals, respectively, the in-phase (I) signal also referred to as Re$\{E_k'\}$ signal 470A, while the quadrature (Q) signal also referred to as the Im$\{E_k'\}$ signal 470B.

Each gain term $w_n$ may be provided by a control system 480, as depicted. As with the gain term w, the gain terms $w_n$ may be fine tuned to provide an optimal output. The tunability itself can be provided by an operator manually adjusting one or more of the gain terms $w_n$ while viewing the output signal 480 until an optimal output signal is achieved. Alternatively, the control system can be provided with a representation of the output signal 480 as feedback, the control system continually adjusting the gain term w until an optimal output is achieved.

Figure 5:
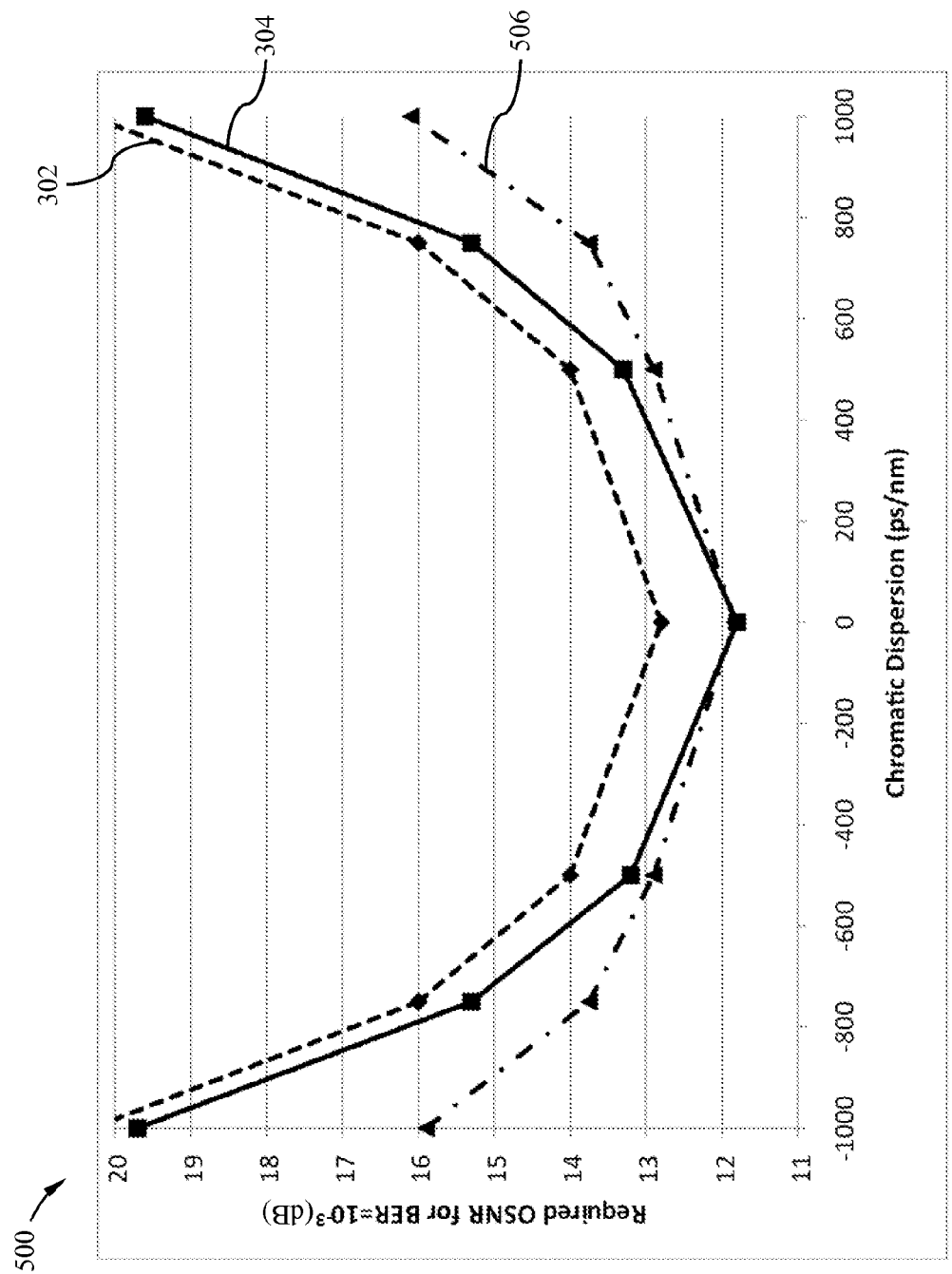
FIG. 5 is a graph depicting advantages of the second signal processing circuit of FIG. 4.

FIG. 5 illustrates improvement achieved with respect to chromatic dispersion, as shown by graph 500. Graph 500 is similar to graph 300 of FIG. 3, however includes the curve 506 which depicts the noise tolerance with respect to chromatic dispersion through utilization of the cascade of signal processing circuit 200 of FIG. 2, with the output from that block further processed by signal processing circuit 400 of FIG. 4. More specifically, as shown, a minimal value of approximately 1.2 dB of improvement is observed with respect to chromatic dispersion of approximately 500 ps/nm between an unprocessed signal, identified as curve 302 of graph 500, and a processed signal, identified as curve 506 of graph 500. Further improvement of noise tolerance with respect to chromatic dispersion is observed for values of chromatic dispersion greater than 500 ps/nm, as depicted.

Figure 6:
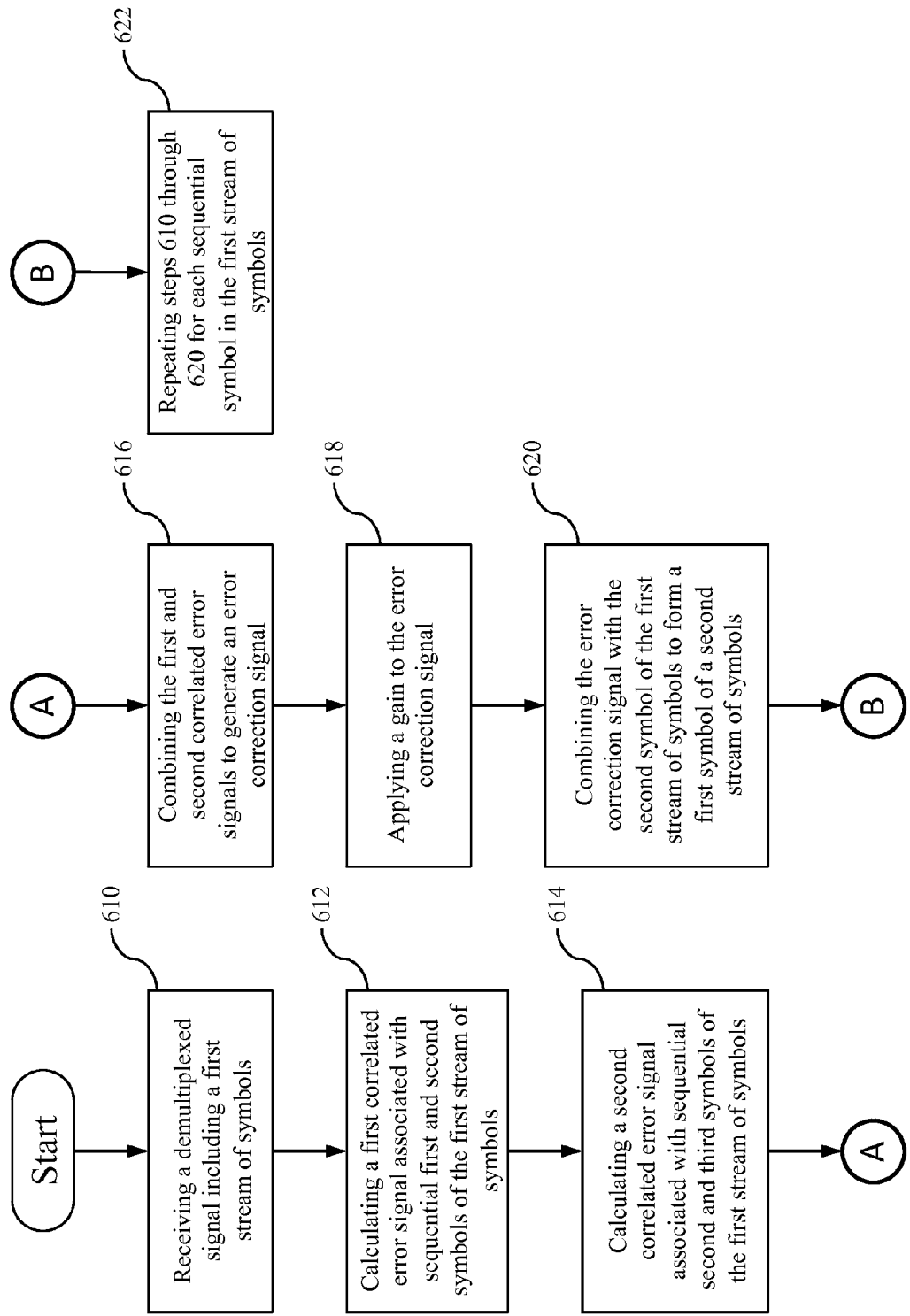
FIG. 6 is a flow chart illustration of a method, independent of structure, of processing a signal within a receiver, in accordance with various embodiments of the invention.

Now turning to FIG. 6, a method, independent of structure, for processing a signal within a receiver, in accordance with various embodiments of the invention is depicted. A demultiplexed DQPSK signal is received 610 which includes a stream of symbols representing the in-phase (I) and the quadrature (Q) portions of the DQPSK signal. The symbol stream includes first, second, and third sequential symbols. A first correlated error associated with first and second sequential symbols of the symbol stream is calculated 612. A second correlated error associated with second and third sequential symbols of the symbol stream is also calculated 614. Thus, relative to the second symbol, the first correlated error signal represents, for example, an error signal forward-looking 1 baud period and the second correlated error signal represents, for example, an error signal backward-looking 1 baud period. The first and second correlated errors are then combined to provide an error correction signal 616. Optionally, a gain can be applied to the error correction signal 618 prior to combining the error correction signal with the second symbol of the symbol stream to form a first symbol of a new DQPSK signal. The optional gain need not be applied to the error correction signal itself, as shown. Rather, the optional gain may be applied to each of the first and second correlated error values, for example, prior to combining the first and second correlated error signals in the step 616 (Not shown). Alternatively the optical gain may be applied to each of the first and second correlated error values, as well as the error correction signal (Not shown). The process is continuously repeated 622 on each sequential symbol of the first symbol stream to continuously generate corresponding sequential symbols of the second symbol stream, the second symbol stream representative of a new DQPSK signal having improved tolerance to optical noise and chromatic dispersion.

While the invention has been described in conjunction with several specific embodiments, it is evident to those skilled in the art that many further alternatives, modifications and variations will be apparent in light of the foregoing description. For example, corrections represented by equations 8, 9 and 13 rely on preliminary decisions which inherently suffer from error propagation. Certain well known techniques may be utilized to mitigate error propagation, such as decision feedback, or maximum likelihood sequence estimation (MLSE). Additionally, the various embodiments disclosed herein may be applied to additional modulation techniques where, like DQPSK, correlated errors can be determined with respect to any symbol, or other data bit representation, in both, a forward-looking and a backward-looking direction with respect to that symbol. Thus, the invention described herein is intended to embrace all such alternatives, modifications, applications and variations as may fall within the spirit and scope of the appended claims.

What is claimed is:

1. A receiver, comprising:
    a circuit coupled to receive a first stream of symbols including first, second, and third symbols of a differential signal, the first, second, and third symbols being sequential in time,
    the circuit configured to generate an error correction signal in response to said received first, second, third stream of symbols, the error correction signal including a first correlated error signal associated with the first and second symbols of the first stream of symbols and a second correlated error signal associated with the second and third symbols of the first stream of symbols, and
    the circuit configured to combine the error correction signal with the second symbol of the first stream of symbols to provide a first symbol of a second stream of symbols provided at an output of the circuit.

2. The receiver of claim 1, wherein the circuit further comprises a gain element coupled to receive the error correction signal and provide a gain to the error correction signal prior to combining the error correction signal with the second symbol of the first stream of symbols.

3. The receiver of claim 2, wherein the gain provided to the error correction signal is based on a bit-error ratio.

4. The receiver of claim 2, further comprising a forward error correction circuit, the gain provided to the error correction signal being based on a number of error corrections performed by the forward error correction circuit.

5. The receiver of claim 2, wherein the gain provided to the error correction signal being based on a data waveform corresponding to an output of the circuit, the data waveform being in the form of an eye opening.

6. The receiver of claim 1, wherein the circuit comprises one or more devices selected from the group consisting of a programmable memory, an erasable programmable memory, an electrically erasable programmable memory, a microprocessor, a digital signal processor, an application specific integrated circuit, a programmable gate array, a field programmable gate array, an analog circuit, and a digital circuit.

7. The receiver of claim 1, wherein the differential signal is a differential quadrature phase-shift keying signal.

8. The receiver of claim 7, wherein a first portion of the differential signal is an in-phase signal.

9. The receiver of claim 7, wherein a second portion of the differential signal is a quadrature signal.

10. The receiver of claim 1, where the circuit is a first circuit, the receiver further comprising a plurality of photodiodes and a second circuit, each of the plurality of photodiodes configured to accept a corresponding one of a plurality of optical signals and convert the corresponding one of the plurality of optical signals into a corresponding one of a plurality of electrical signals, the second circuit configured to accept the plurality of electrical signals and provide the differential signal to the first circuit.

11. A receiver, comprising:
a plurality of photodiodes, each configured to receive one of a plurality of optical signals and provide a plurality of electrical signals;
a first circuit which generates a differential signal in response to the plurality of electrical signals, the differential signal comprising a plurality of symbols, the plurality of symbols including first, second, and third symbols, the first, second, and third symbols being sequential in time;
a second circuit coupled to receive the differential signal, the second circuit configured to generate an error correction signal in response to said received differential signal, the error correction signal including a first correlated error signal associated with the first and second symbols of the plurality of symbols and a second correlated error signal associated with the second and third symbols of the plurality of symbols,
the second circuit configured to combine the error correction signal with the second symbol of the plurality of symbols to form a first symbol of a second signal provided at an output of the circuit.

12. The receiver of claim 11, wherein the differential signal is a first differential signal and the second signal is a second differential signal.

13. The receiver of claim 12, wherein the second differential signal is a differential quadrature phase-shift keying signal.

14. The receiver of claim 11, wherein the circuit further comprises a gain element coupled to receive the error correction signal and provide a gain to the error correction signal prior to combining the error correction signal with the second symbol of the plurality of symbols.

15. The receiver of claim 11, wherein the circuit comprises one or more devices selected from the group consisting of a programmable memory, an erasable programmable memory, an electrically erasable programmable memory, a microprocessor, a digital signal processor, an application specific integrated circuit, a programmable gate array, a field programmable gate array, an analog circuit, and a digital circuit.

16. The receiver of claim 11, wherein the differential signal is a differential quadrature phase-shift keying signal.

17. The receiver of claim 16, wherein a first portion of the differential signal is an in-phase signal, and a second portion of the differential signal is a quadrature signal.

18. A method for processing a signal in a receiver:
providing a circuit having an input configured to receive a first stream of symbols, the first stream of symbols including a first, a second, and a third symbol, the first, second, and third symbols being sequential in time;
generating an error correction signal in response to the received first stream of symbols, the error correction signal including a first correlated error signal associated with the first and second symbols of the first stream of symbols and a second correlated error signal associated with the second and third symbols of the first stream of symbols; and
combining the error correction signal with the second symbol of the first stream of symbols stream to form a first symbol of a second symbol stream provided at an output of the circuit.

19. The method of claim 18, wherein the step of combining the error correction signal includes the initial step of applying a gain to the error correction.

20. The method of claim 19, wherein the gain applied to the error correction signal is based on a bit-error ratio.

21. The method of claim 19, wherein the gain applied to the error correction signal is based on a number of error corrections performed by a forward error correction circuit.

22. The receiver of claim 19, wherein the gain applied to the error correction signal is based on a data waveform corresponding to an output of the circuit, the data waveform being in the form of an eye opening.

23. The method of claim 18, wherein the first stream of symbols is a differential signal.

24. The method of claim 23, wherein the differential signal is a differential quadrature phase-shift keying signal.

25. A method for processing a signal in a receiver:
providing a circuit having an input for receiving a first stream of symbols, and an output;
generating an error correction signal by combining a first output error correction signal and a second output error correction signal, the first output error correction signal being generated by applying a first delay having a first time period to the error correction signal, the second output error correction signal being equal to the error correction signal;
generating a delayed stream of symbols by applying a second delay having a second time period to the first stream of symbols, the second time period being less than the first time period; and
combining the error correction signal with the delayed stream of symbols to generate a second stream of symbols provided on the output of the circuit.

26. The method of claim 25, wherein the differential signal is a differential quadrature phase-shift keying signal.

27. The method of claim 26, wherein a first portion of the differential signal is an in-phase signal, and a second portion of the differential signal is a quadrature signal.

* * * * *